Mar. 27, 1923.

G. A. BUTTRESS ET AL.
PLASTER BOARD CONSTRUCTION.
FILED APR. 25, 1922.

1,449,728.

Inventor
GEORGE A. BUTTRESS,
JOSEPH A. BUTTRESS,
By
Attorney

Patented Mar. 27, 1923.

1,449,728

UNITED STATES PATENT OFFICE.

GEORGE A. BUTTRESS, OF LOS ANGELES, AND JOSEPH A. BUTTRESS, OF PASADENA, CALIFORNIA.

PLASTER-BOARD CONSTRUCTION.

Application filed April 25, 1922. Serial No. 556,385.

*To all whom it may concern:*

Be it known that we, GEORGE A. BUTTRESS and JOSEPH A. BUTTRESS, citizens of the United States of America, residing at Los Angeles and Pasadena, respectively, in the county of Los Angeles and State of California, have invented new and useful Improvements in Plaster-Board Construction, of which the following is a specification.

Our invention relates to a composition lath and wall board and particularly pertains to the type of composition lath and wall board in which a plastic or cementitious material is formed in a panel having its opposite sides covered with facing sheets and in which means are provided for effecting a bond with a plaster coating.

In composition lath and wall boards of the above character, the bonding means ordinarily comprise recesses, depressions or perforations formed in the wall board, or protuberances projectiing therefrom, which are objectionable in the first instance because of weakening the board, and in the second instance because the protuberances are frequently broken off in handling the board.

It is the purpose of our invention to provide a construction in a composition lath and wall board whereby a bonding means may be obtained without forming the board with the objectionable depressions, recesses or protuberances and which is of such character that the board may be readily formed in a manner commonly employed in the manufacture of a plain wall board comprising a plastic panel and side facing sheets.

With the foregoing objects in view, together with such other objects and advantages as may subsequently appear, our invention resides in the construction and arrangement hereinafter described and claimed and illustrated in the accompanying drawings, in which:—

More specifically, 3 indicates a body of cementitious or plastic material which is formed in a panel and is covered on one side by a backing sheet 4 of paper or other suitable sheet material and is covered on its other side by a facing sheet 5 preferably formed of a water-proofed or sized sheet material.

The essence of the present invention resides in forming the facing sheet 5 with a series of perforations or apertures which are preferably rectangular and arranged in rows with the apertures in one row offset in relation to the apertures in the adjacent row into which apertures the plastic or cementitious material of which the body 3 is formed projects to form exposed plastic areas at intervals throughout the facing sheet, the surfaces of which exposed areas of plastic lie on a plane substantially flush with the outer surface of the spacing sheet and are roughened or scratched to provide a surface to which a plastic coating will readily adhere. The plastic body 3 is inherently absorptive in character which, with the roughener surface exposed through the facing sheet, serves to effect a bond with a surface coating of plaster applied to the outer surface of the facing sheet.

Figure 1:
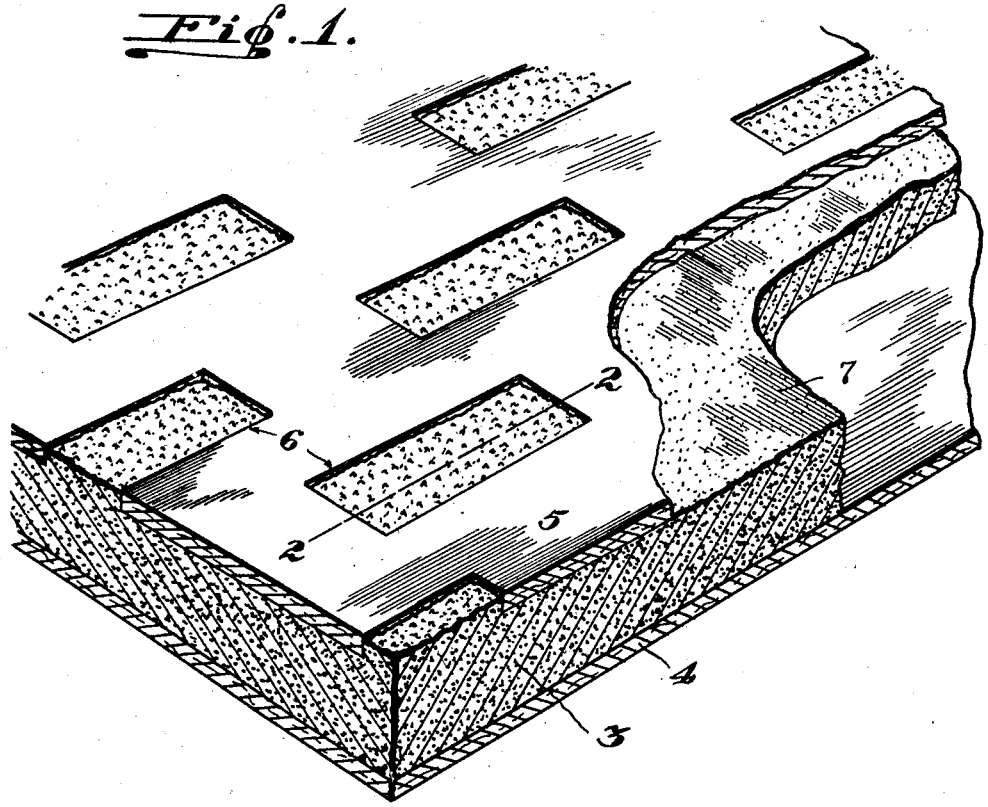
Figure 1 is a perspective view of a fragmentary portion of a combination lath and wall board constructed in accordance with the invention.
Figure 2:
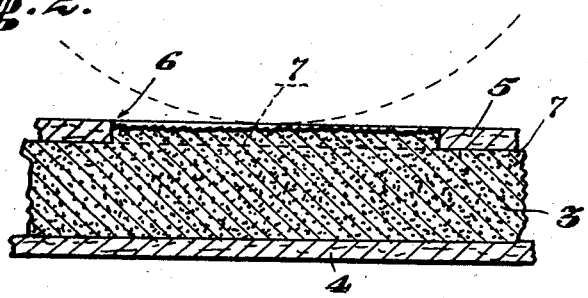
Fig. 2 is a detail in section on the line 2—2 of Fig. 1.

In forming the composition lath and wall board the backing sheet 4, the facing sheet 5 and the plastic composition to form the body 3 are passed between suitable panel-forming rolls as is common in wall board construction; the composition being fed between the backing and the facing sheets. In carrying out our invention the facing sheet 5 is formed with the apertures 6 before it is applied to the composition body so that as the panels are passed between the rollers the composition will be pressed into the apertures 6 to fill the latter and yet not protrude beyond the surface of the facing sheet. The roughening of the surface of the exposed area of the plastic body in the apertures 6 is accomplished by passing the panel beneath a roller arranged to bear on the facing sheet so as to contact the surface of the exposed plastic body as indicated in dotted lines in Figure 2 at a time when the composition contacted by the roller will adhere to the latter and be pulled from the surface of the plastic body 7 and thereby form sharp and irregular projections throughout the exposed surface of the plastic body to which plaster will readily adhere.

The exposed surfaces of the plastic body provide absorptive areas throughout the panel which will act to effect a suction on fresh plaster applied to the panel in such manner as to hold the plaster coating in place until it sets whereupon the coating will be held by the keyed engagement with the projections on the exposed surface of the plastic of the panel as well as by its adhesiveness.

The wall board thus formed is of equal thickness throughout and is free from objectionable recesses or depressions and is also free of protuberances projecting beyond the surface of the board.

We claim:—

1. A composition lath and wall board comprising a panel of absorptive plastic material, a backing sheet covering one side of said panel, and a facing sheet extending over the other side of said panel; said facing sheet being formed with a series of apertures into which portions of the plastic composition project and terminate substantially flush with the outer surface of the facing sheet; the surface of the plastic material being exposed through said apertures and having irregular projections of the absorptive plastic material protruding therefrom forming bonding keys throughout said exposed surfaces.

2. A composition lath and wall board comprising a panel of plastic material, a backing sheet covering one side of said panel and a facing sheet extending over the other side of said panel; said facing sheet being formed with a series of apertures and the plastic body formed with portions projecting into said apertures and terminating substantially flush with the outer surface of the facing sheet forming exposed areas of plastic material throughout the panel, said exposed areas being roughened.

GEORGE A. BUTTRESS.
JOSEPH A. BUTTRESS.